United States Patent [19]
Bononi

[11] 4,243,306
[45] * Jan. 6, 1981

[54] PAD DEVICE

[76] Inventor: Walter H. Bononi, Zeppelinstrasse 9, 7012 Fellbach-Schmiden, Fed. Rep. of Germany

[*] Notice: The portion of the term of this patent subsequent to Feb. 27, 1996, has been disclaimed.

[21] Appl. No.: 910,486

[22] Filed: May 30, 1978

Related U.S. Application Data

[63] Continuation-in-part of Ser. No. 731,737, Oct. 12, 1976, abandoned.

[51] Int. Cl.³ .............................................. G02C 5/12
[52] U.S. Cl. ................................................. 351/136
[58] Field of Search ................ 351/136, 137, 78, 131, 351/41, 132

[56] References Cited
U.S. PATENT DOCUMENTS

| 3,584,939 | 6/1971 | Olson | 351/136 |
| 3,923,385 | 12/1975 | Ahern | 351/132 |
| 4,142,784 | 3/1979 | Bononi | 351/136 |

FOREIGN PATENT DOCUMENTS

| 2545683 | 4/1977 | Fed. Rep. of Germany | 351/136 |
| 1540371 | 8/1968 | France | 351/137 |
| 445100 | 4/1936 | United Kingdom | 351/136 |

*Primary Examiner*—John K. Corbin
*Assistant Examiner*—B. W. de los Reyes

[57] ABSTRACT

A pad of homogeneous material has a closed, substantially smooth surface. It is age-resistant, wear-resistant and gentle on the skin. It can be permanently connected to the material used for spectacle frames, made of translucent material and made with a lustrous surface. It has a Shore D hardness of 10 to 30 measured in accordance with DIN 53 505.

12 Claims, 6 Drawing Figures

PAD DEVICE

This is a Continuation-in-Part of Application Ser. No. 731,737, filed Oct. 12, 1976 now abandoned.

The invention relates to a pad for application to the root area of the nose of a person wearing spectacle frames.

One of the main problems with spectacles is that they have to be satisfactorily supported in every respect on the root or bridge of the nose. This problem can be difficult to overcome because the supporting surface of the pad must be kept small for technical or fashion reasons and/or the spectacles have to be worn all day by the spectacle wearer and/or the spectacles are heavy, because the dioptre is high and/or the spectacle wearer has a difficult nose shape (e.g. a flat Asiatic nose root) and/or the wearer is inclined to perspire and/or the wearer works in a humid environment and/or the wearer has a sensitive skin and/or the wearer has too little fatty tissue between the skin and nose bone and/or the pads frequently slip over the skin, which can occur, e.g. under the effect and pressure of the wind and/or the pad was previously a good fit, but the nose area of the person wearing the spectacles has also in the meantime become thicker or thinner.

The problem confronting the inventor is to provide a pad with which the above mentioned difficulties are increasingly overcome, which can be cheaply made by mass-production, which from the aesthetic viewpoint imposes just as few limitations on the designer as before, whose reliance on dirt absorption and dirt grooves is just as problem-free as previously known pads and which can be used in quantity with all types of spectacles, i.e. on which the customer himself no longer needs to take further steps later, such as, e.g. sticking foam material to the inner side of known pads.

This problem is solved in accordance with the invention in that the pad is made of a homogeneous material, it has a closed and substantially smooth surface, it is age-resistant and gentle on the skin in view of its use with spectacles, and wear-resistant during wearing, it is made of a material that can be connected durably and directly, material to material, to the material used for spectacle frames, can be made of translucent material, made with a lustrous surface, and it has a Shore D hardness of 10 to 30 measured in accordance with DIN 53 505. Such a pad can be within a range of 10 to 20 measured on the Shore D scale and more narrowly, at a hardness of 16±15%.

Such a pad can be made e.g. of a material produced by FirmaHuls, which material is sold under the trade name VESTOLID and has the specification "Soft granular material SSp 56". This pad has a Shore D hardness of 15 to 17 measured according to DIN 53 505. Shore D hardness is a hardness measure of materials determined according to procedures specified in West German industrial standards (DIN). DIN is to a large extent the same as ASA. The DIN standard prescribes the way in which hardness (or better, softness) is measured. It is necessary to be prescribed, because there are different types of hardness measurements. In this case DIN 53 505. When measured thus, the previously used acetate has a hardness of 72 to 75 and the previously used cellulose a hardness of 68 to 72. It can therefore be seen from this that the hardness has been reduced by approximately three times.

In principle, silicone rubber could also be used. It must be molded thereby rendering the product costly in most cases. The silicone rubber usually has a Shore D hardness of 9, which could be slightly too soft or limp for the present purpose in many cases.

However, the problem is solved in accordance with the invention by the silicone resin material, Sylgard (Registered Trademark No. 186) of the DOW CORNING Company.

This resin is a silicone elastomer of high mechanical strength and is used per se as an embedding resin for molding in electrical connections, cable harnesses, printed circuits and components, as well as for making injection-molded high voltage terminals, for sealing and bonding and for the assembly of equipment or units.

The precise properties of the resin are explained in Leaflet 07-347-03 of October 1971 from the DOW CORNING Company entitled "Information on materials for the electrical and electronic industries".

This data can also be found in the "Guide to the selection of DOW CORNING products for the electrical and electronic industry". The outstanding advantages in the field of spectacle lens systems are as follows:

1. The skin below the material remains considerable drier. The material is evidently highly permeable to water, vapour and gas. An excellent exchange of fluid obviously takes place.

2. The high purity of the material at the same time produces the very transparency which is needd in spectacle lens systems.

3. The material has a high tear propagation resistance so that damage to the material hardly affects its durability.

4. No kind of perspiration or environmental factors can have a detrimental effect on the pads. No substances are removed and therefore the problem of harmful resulting reactions does not apply either.

5. Although silicone is principally also a lubricant or release agent, it can be bonded with the adhesive RTV 732 of the DOW CORNING Company.

6. The thus produced pads are particularly well supported on all possible kinds of human skin. As an explanation, one could imagine in this case an effect similar to that with surfboards the standing surface of which is extended to ensure that safe support is also obtained in the water.

7. Together with the high tear propagation resistance, a high temperature stability from −65 degrees Celsius to +200 degrees Celsius is obtained.

8. The material has no filler, i.e. there can be no migration from the material.

9. The material provided for processing, comprises two fluid components. Therefore, the substance does not need to be liquefied first by laborious methods—as is the case with granulated material—and simple machines can therefore be used, thereby partially compensating for the price of 65 DM per kilogram which is in itself high.

10. The material also allows the pads to be molded at atmospheric pressure. The molds are therefore also simplified and the pad thus becomes cheaper to make. The high pressures necessary for injection molding do not need to be produced either.

11. The material hardens so slowly that the machine for mixing the two components can be conveniently cleaned and time is not wasted.

12. Also, the pads do not have a sticky surface after being worn for a relatively long time nor from the very beginning. This applies particularly when a conventional liquid soap is used as a mold lubricant or release agent, e.g. that used in factories, toilets, etc. This applies particularly if the liquid soap WAYOLAN Art. No. 6 332 of the Enzian Company from 7418 Metzingen, West Germany, is used.

13. Although the material involved here is a silicone rubber, a Shore D hardness of between 10 and 20, particularly about 16, is obtained with this material without any particular adjustment and when using the original materials as supplied by the factory. The Shore A hardness is 30, measured in accordance with the ASTM test method No. D 676.

Pads within the meaning of the invention are also tags or like means for supporting spectacles on the nose.

In general it should be ensured that the pad is sufficiently soft, but not so soft that is excessively deflected, and that the harder part of the spectacles is still supported on the skin, such as e.g. metallic inlays in the pads, retaining pins, the rim of the spectacles or the like.

The invention will now be described with the aid of practical embodiments.

Figure 1:
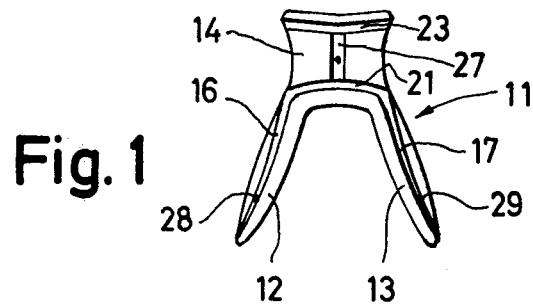
FIG. 1 shows, approximately to scale, the front view of a very large pad.

A one-piece pad 11 comprises two wings or arms 12, 13 which are joined by a cross piece 14. The pad 11 is made of molded silicone resin, Sylgard No. 186. The fronts of the wings 12, 13 shown in FIG. 1 comprise respectively outwardly open L-shaped grooves 16, 17 which are so narrow that they can receive a spectacle rim 18, 19 in alignment. The top of the L-shaped grooves 16, 17 extends into a recessed U-shaped groove 21 which runs through the bottom section of the cross piece 14. The web 22 connecting the spectacle rims 18, 19 is situated in the U-shaped groove 21. The cross piece 14 comprises in its top section a U-shaped groove 23 into which fits a web 24 connecting the rims 18, 19. As can be seen from FIG. 2, the connecting webs 22, 24 are joined by a vertical web 26 of I section with part of its length lying in a very flat vertical U-shaped groove 27.

Figure 2:
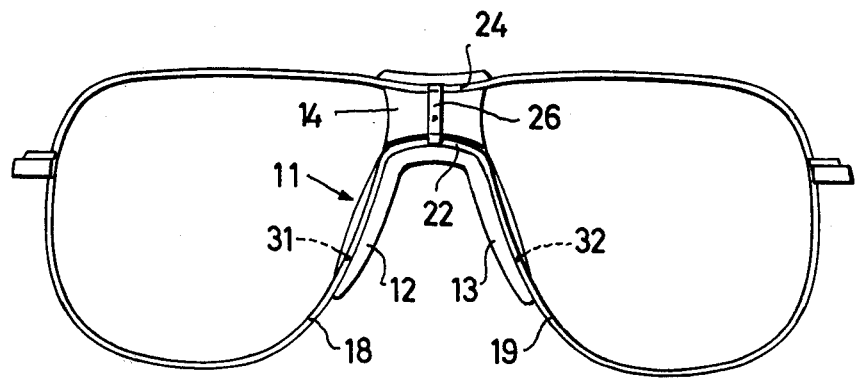
FIG. 2 shows the pad according to FIG. 1 mounted on a spectacle frame.

In the wings 12, 13, in the wall area of the L-shaped grooves 16, 17 which can be seen in FIG. 1, there are provided retention holes 28, 29 which are in the form of blind holes and in which fit pins 31, 32 which are soldered on to the rims 18, 19 at an obtuse angle so as to extend in a rearward direction as shown in FIG. 2. Also on the web 26 there can be provided such a pin which then engages in a retention hole in the bottom of the U-shaped groove 27. The wings 12, 13 extend rearwardly until a sufficiently large bearing surface is formed. In addition to the properties mentioned in the introduction to the specification, a further feature of this pad 11 is that it can very simply be fitted on a pair of spectacles because, in contrast to a pad made of acetate or cellulose, it engages easily on the rims 18, 19 and connecting webs 22, 24. It does not need to be heated. As a result of its rubber ram-like material property, the pad may therefore also be cheaper to fit. This rubber ram-like property of the material also means that the heat conductivity of the pad is reduced. In the case of metal-rimmed spectacles, therefore, it is not necessary to fear what has sometimes occurred, namely, that in the event of very cold weather partial frostbite of the nose may occur because the hard plastic material which was hitherto used for pads has too much heat conductivity.

Figure 3:
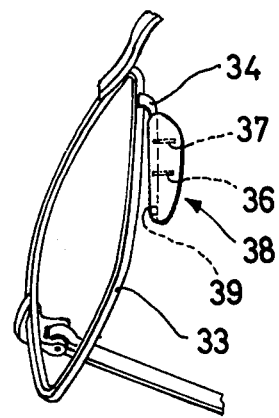
FIG. 3 shows a pad according to the invention, attached to a pad lever on a pair of metal-rimmed spectacles.
Figure 4:
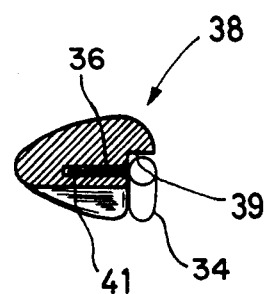
FIG. 4 is a horizontal section through a pad which was used in FIG. 3.

FIG. 3 shows a spectacle rim 33 with a metal pad lever 34 soldered in a manner known per se to the area of the rim directed towards the nose. The pad lever 34 of Sylgard No. 186 is approximately rectangular in cross section and two retaining pins 36, 37 are soldered to its face sloping forward and to the left as shown in FIG. 3, from the point of view of the wearer. The pad 38 is secured to the lever 34 by the retaining pins 36, 37 inserted in retention holes 41. The pad 38 provided on the pad lever 34 is kidney-shaped in a manner known per se. As shown in FIG. 4 it comprises a cut-out 39 against which the lever 34 is located, as well as retention holes 41 in which the pins 36,37 extending from the face of pad lever 34 are retained.

Figure 5:
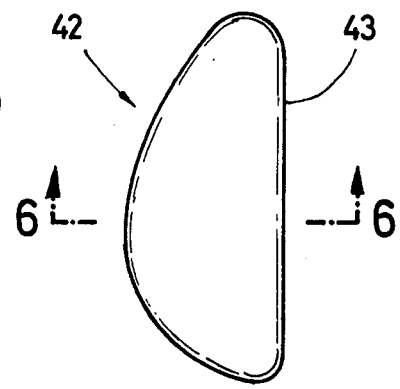
FIG. 5 shows, on a larger scale, a side view of a pad whose base can be bonded to the edge of a pair of plastic-rimmed spectacles.
Figure 6:
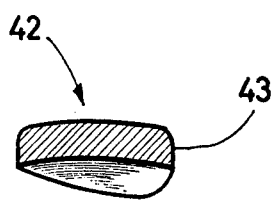
FIG. 6 is a horizontal section through the pad shown in FIG. 5.

In the third embodiment shown in FIGS. 5 and 6 the pad 42 of Vestolid, injection-molded soft PVC (polyvynalchloride) is also kidney-shaped and clearly three-dimensionally curved. It comprises a face 43 perpendicular to the plane of the drawing in FIG. 5, i.e. straight in this direction. The surface shown in plan view in FIG. 5 rests against the wearer's nose. When viewed from the top downward, the face 43 is slightly curved. The pad 42 can therefore be easily bonded to the rims of plastic-rimmed spectacles. It would be best for this pad 42 not to be bonded at an obtuse angle to the spectacle rim. On the contrary, it would be preferable to mill an L-shaped or perhaps even a U-shaped groove in the rim thus creating a better adhesive fit for the pad 42.

What is claimed is:

1. A pad to be applied to the root area of the nose of a person wearing spectacle frames, comprising
   a homogenous material body having a closed, substantially smooth surface,
   said body material being permanently bondable to material used for spectacle frames,
   said body material being age-resistant and wear-resistant when worn,
   said material body having a lustrous surface and can be made translucent,
   said body material softness within a range of 10 to 30 measured according to DIN 53 505 on the Shore D hardness scale.

2. A pad as claimed in claim 1, characterized in that it has a hardness of 10 to 20.

3. A pad as claimed in claim 2, characterized in that it has a hardness of about 16 ±15%.

4. A pad as claimed in claim 1 wherein said material body is provided with opening means for receiving locking pins provided on the spectacle frame.

5. A pad as claimed in claim 1, wherein it is shaped to enable engagement on the spectacle frame.

6. A pad as claimed in claim 5, having grooves in which the rims of the frame can lock.

7. A pad as claimed in claim 1 having a kidney shape.

8. A pad as claimed in claim 1, wherein the pad base is bonded to the material of the rim of the spectacle frame.

9. A pad as claimed in claim 1, wherein said material is of Vestolithian type.

10. A pad as claimed in claim 1, wherein it is shaped like a saddle.

11. A pad as claimed in claim 1, wherein said material body is provided with two approximately vertical opening means for receiving a pad lever inserted into each.

12. A pad as claimed in claims 1, 2, 3, 4, 5, 6, 7, 8, 10 or 11, wherein said material is the silicone resin sold under trademark Sylgard No. 186.

* * * * *